United States Patent [19]

Weiler et al.

[11] Patent Number: 4,842,103
[45] Date of Patent: Jun. 27, 1989

[54] AUTOMATIC ADJUSTING DEVICE FOR A DISC BRAKE WITH PRESS FIT MEMBERS

[75] Inventors: Rolf Weiler, Frankfurt am Main; Claus-Peter Panek, Steinbach; Bodo Schmidt, Lauterbach, all of Fed. Rep. of Germany

[73] Assignee: Alfred Teves GmbH, Frankfurt am Main, Fed. Rep. of Germany

[21] Appl. No.: 136,044

[22] Filed: Dec. 21, 1987

[30] Foreign Application Priority Data

Dec. 22, 1986 [DE] Fed. Rep. of Germany ....... 3643923
Jan. 22, 1987 [DE] Fed. Rep. of Germany ....... 3701693

[51] Int. Cl.$^4$ ..................... F16D 55/224; F16D 65/56
[52] U.S. Cl. ............................... 188/71.9; 188/196 D
[58] Field of Search ............................. 188/71.7-71.9, 188/72.7, 72.9, 196 D, 196 P, 196 V, 106 F; 192/111 A

[56] References Cited

U.S. PATENT DOCUMENTS 4,598,800 7/1986 Marianu ..................... 188/196 D X

FOREIGN PATENT DOCUMENTS 3505411 8/1986 Fed. Rep. of Germany .
3514711 10/1986 Fed. Rep. of Germany ... 188/196 V
2175658 12/1986 United Kingdom ........... 188/196 V Primary Examiner—Robert J. Oberleitner
Attorney, Agent, or Firm—James B. Raden

[57] ABSTRACT

An automatic adjusting device for a disc brake having a brake piston displaceably arranged in a brake cylinder for the purpose of actuation of a brake shoe. This device which is actuatable by means of a hydraulic and a mechanical actuating device, includes an adjusting member between the brake piston and the mechanic actuating device which member is composed of two adjusting elements, an adjusting spindle and adjusting nut interconnected via a thread without self-locking engagement. It further comprises a friction clutch having conical friction surfaces for fixing one of the adjusting elements in position on mechanical actuation. One of the conical friction surfaces is on one of the adjusting elements and the other friction surface is on a mechanically actuatable clamping member. It also comprises a bowl-type (cup-shaped) spring retainer which is secured to the brake housing by means of an accommodation sleeve. In order to render manufacture as simple and cost-effective as possible, the accommodation sleeve is made from a straight tubular member which is pressed into a corresponding bore in the brake housing.

13 Claims, 2 Drawing Sheets

AUTOMATIC ADJUSTING DEVICE FOR A DISC BRAKE WITH PRESS FIT MEMBERS

BACKGROUND OF THE INVENTION

The present invention relates to an automatic adjusting device for a disc brake.

Such an adjusting device is disclosed in W. German published application DE-OS 35 05 411 A1 which application was published on Aug. 21, 1986. In that adjusting device, the friction clutch is arranged between the adjusting nut and a mechanically actuatable clamping member. In the clutch area, the adjusting nut includes a radially outwardly extending trumpet-like expansion having a friction surface which cooperates with a corresponding friction surface on the clamping member. The clamping member is relatively large, extending far outwards in order to embrace the trumpet-like expansion of the adjusting nut from the outside. Although this known device works satisfactorily, the requirements for its manufacture are complex and difficult, making its manufacture costly.

SUMARY OF THE INVENTION

Therefore, it is a primary object of the present invention to improve upon the known automatic adjusting device so as to render its manufacture simpler and hence cheaper.

This object is accomplished by an automatic adjusting device for disc brakes in accordance with this invention. This device is easy to manufacture due to the shape and the arrangement of its component parts, thus reducing its manufacturing costs.

In particular, this is accomplished by the use of a straight tube as an accommodation sleeve. The mounting of the adjusting device is carried out most simply by the pressing in of the accommodation sleeve. For this purpose there may be used either a press fit with a 'centerless' ground sleeve or a sleeve of slotted design.

An advantageous embodiment of this invention provides that a compensating washer is arranged between the accommodation sleeve and the bottom, that is, a shoulder of the bore. The inventive design requires only a single compensating washer for adjusting the operational clearance. There is no need for additional compensating washers to adjust lengths caused by caulking, since in contrast to prior devices, there is no caulking action. The result thereof is enhanced ease of manufacture since material deformations do not occur.

According to another advantageous embodiment of this invention, the tube forming the accommodation sleeve has a slightly larger diameter in the area of the clamping connection because a step is formed at the end of the tube projecting from the bore. A like step or projection facilitates the pressing in of the accommodation sleeve. However, in the event of a low press-in force, the pressing in may also be effected through the use of a threaded sleeve and bearings.

In order to use as little space as possible in the axial direction, another favorable embodiment of the present invention has the adjusting nut extend into a recess designed in the clamping member.

Another embodiment of the present invention eliminates torsion on the clamping member by the presence in the accommodation sleeve of a lateral recess in which there is guided a pin projecting into a bore of the clamping member.

Another embodiment uses conical contact surfaces between the accommodation and press-in sleeves to increase the press-in length of bowl-type spring retainer for a spring retaining the accommodation sleeve and accommodation sleeve brake housing. Higher axial withdrawing forces and torsion forces result therefrom. Also lower manufacturing costs occur due to higher permitted manufacturing tolerances.

An embodiment of this invention furnishes the accommodation sleeve and the press-in sleeve with conically designed contact surfaces.

According to another embodiment, a washer is located between the accommodation sleeve and a projection formed in the bore.

In a preferred embodiment, the accommodation sleeve and/or the press-in sleeve and/or the threaded sleeve are made from a straight tubular member.

BRIEF DESCRIPTION OF THE DRAWING

Embodiments of this invention are illustrated in the accompanying drawings and will be described hereinbelow.

In the drawings.

DETAILED DESCRIPTION OF A PREFERRED EMBODIMENT

Figure 1:
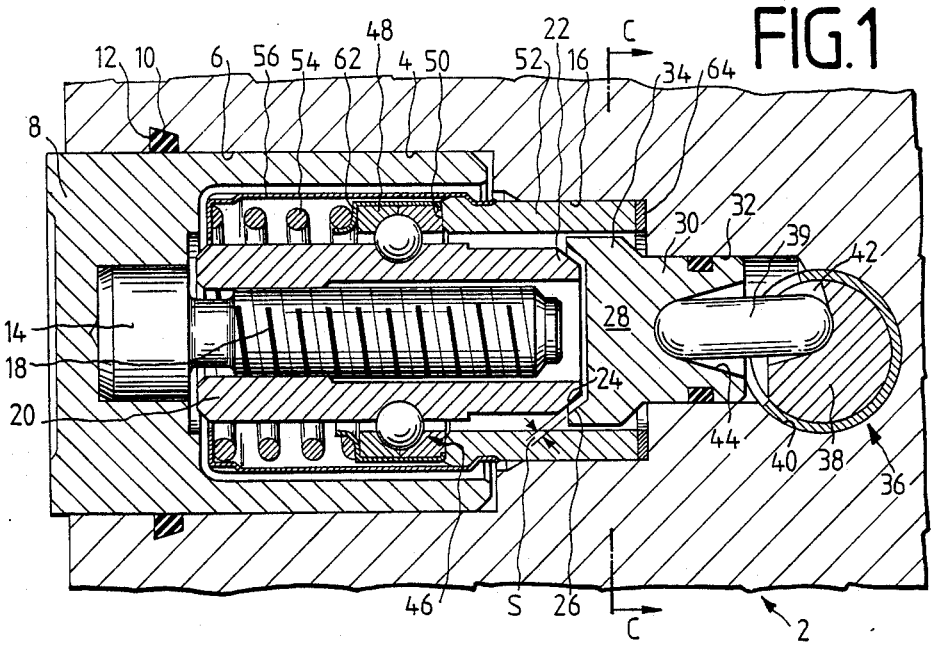
FIG. 1 is a longitudinal cross-section through a first embodiment of a portion of a disc brake with an automatic adjusting device.

Referring to FIG. 1 a brake housing 2 incorporates a cylindrical bore 4 which is stepped several times. A brake piston 8 is axially displaceably accommodated in the bore portion 6 having the largest diameter. The brake piston 8 is of bowl-type or cup-shaped design with its open end being arranged in the cylinder bore 4, while its closed end projects from the cylinder bore 4 in order to press against a (non-illustrated) brake shoe. To seal the brake piston 8 in relation to the cylinder bore, a so-called roll-back seal 10 is arranged in a known manner in an annular groove 12 of the brake housing 2. The seal also causes resetting of the brake piston 8.

Fitted to the inside surface of the bottom of the brake piston 8, in a torsionally secured fashion, is an adjusting spindle 14 which extends coaxially through the hollow space formed by the brake piston up to a reduced-diameter portion 16 of the bores. Said adjusting spindle 14 is formed with a coarse thread 18 without self-locking engagement. An adjusting nut 20 is formed with a mating thread and is thus arranged on the adjusting spindle 14. Said adjusting nut 20 is of substantially cylindrical shape and includes a conical friction surface 24 on its end 22 remote from the piston. Consequently, said nut may be manufactured from a simple, optionally stepped tubular member in a manner that is easy to manufacture.

Cooperating with the conical friction surface 24 is another conical friction surface 26 which is provided on a clamping member 28. This clamping member 28, sometimes referred to as a hand brake piston, comprises a cylindrical portion 30 which is slidably arranged in a further reduced-diameter portion 32 of the bore 4. The clamping member 28 also has an enlarged-diameter portion 34 on which the friction surface 26 is provided. Portion 34 of clamping member 28 embraces the outer periphery of the end 22 of adjusting nut 20 and its friction surface 24. A hand brake operational clearance S is maintained between the friction surfaces 24, 26. Because the adjusting nut 20 does not have any radial expansion, the clamping member 28 and especially its portion 34 can also be manufactured to have a very small diameter.

Figure 3:
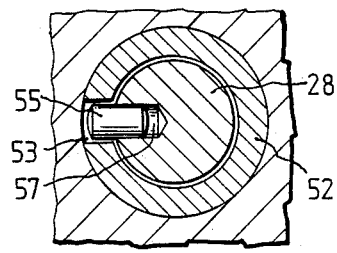
FIG. 3 is a cross-section taken through a torsion-preventing mechanism for the clamping member; and, FIG. 4 is a longitudinal cross-section of a portion of another embodiment of this invention.

The actuating device also comprises an eccentric device 36 acting upon the hand brake piston 28 through a tappet 39. The eccentric device 36 comprises a shaft 38 which is rotatably supported in a bore 40 that extends transverse of the cylinder bore 4. A hand brake lever is mounted on the shaft 38 in a conventional manner (not shown). Formed in the shaft 38 is a recess 42 which receives one end of tappet 39. The other end of the tappet 39 is received in a recess 44 provided in clamping member 28. Clamping member 28 is retained against rotation by means of a torsion-preventing mechanism which is illustrated in FIG. 3.

Part of the adjusting nut 20 adjacent the brake piston 8 is formed with an inner bearing ring that cooperates with an outer bearing ring 48 to carry four ball bearings 46. The outer bearing ring 48 is divided into two like parts, that are joined along a line extending normal to the axis of rotation (vertically as shown in the drawing). One side of the bearing ring 48 abuts on a shoulder 50 formed on the end of an accommodation sleeve 52. This accommodation sleeve 52 is secured in the brake housing 2 and extends in the axial direction between adjusting nut 20 and the wall of brake piston 8. Bearing against the other side of the outer bearing ring 48 is a spring 54 and an associated bearing cage 62. The other end of spring 54 is supported on a bowl-type or cup-shaped spring retainer 56 that is fastened on the accommodation sleeve 52.

In the embodiment of FIG. 1, the bowl-type spring retainer 56 is secured to the accommodation sleeve 52 by the use of indentations. As an alternative to this fastening method, a slip-joint is possible and does not require the provision of corresponding recesses or indentations at the accommodation sleeve 52. See FIG. 2. To adjust the operational clearance, this embodiment uses a compensating washer 64 placed between the accommodation sleeve 52 and the shoulder formed between bore portions 16 and 32. Said accommodation sleeve 52 is made from a simple straight tubular member and is mounted with snug fit in bore portion 16 which has a diameter substantially the same as accommodation sleeve 52. Mounting of the adjusting device is performed by merely pressing in the accommodation sleeve 52 so that it passes around through the adjusting nut 20 and the bearing 46. Since the adjusting nut 20 is made from a straight tubular member at whose one end the friction surface 24 is directly formed, and since the other friction surface 26 of clamping member 28 is also of a relatively small diameter, the accommodation sleeve 52 may be manufactured from a straight simple tubular member.

Figure 2:
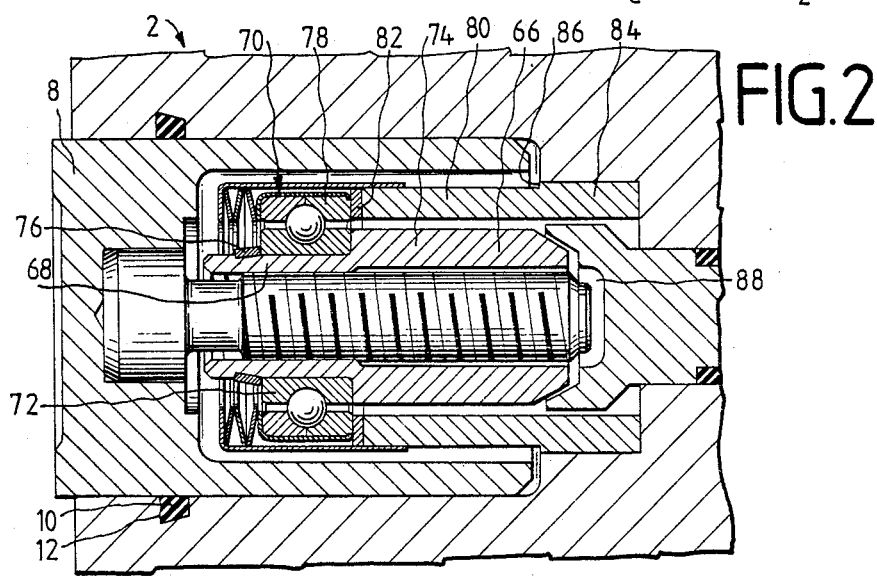
FIG. 2 is a longitudinal cross-section through another embodiment of a portion of a disc brake with an automatic adjusting device.

Reference is made to FIG. 2 which shows another embodiment of an adjusting device. As the brake and also essential parts of the adjusting device correspond to the arrangement illustrated in FIG. 1, only the differences from FIG. 1 will be explained.

An adjusting nut 66 which can also be made from a simple tubular member includes herein a reduced-diameter portion 68 on which a bearing assembly 70 including ball bearings is seated and which forms a separate construction unit. The bearing assembly 70 also includes an inner bearing ring 72 and an outer bearing ring 78. The inner bearing ring 72 abuts on a shoulder formed between the reduced-diameter portion 68 and a large-diameter portion 74. To secure the bearing in position, a retaining ring 76 is arranged in a groove formed in portion 68. A compensating washer 82 is interposed between the outer bearing ring 78 and the end of accommodation sleeve 80 which is made from a simple tubular member also in this embodiment. The sleeve 80 has a portion 84 of somewhat enlarged diameter to provide a snug fit with a reduced diameter portion of the bore formed in housing 2. A step 86 is formed at the end of the portion 84 which facilitates the pressing-in of the accommodation sleeve 80. An optimal load application on the clamping member permits the formation of an indentation 88 which extends beyond the conical area and permits the spindle to advance into this space. Accordingly, the overall length of the device can be reduced.

FIG. 3 shows a cross-section taken along the line C—C in FIG. 1, from which a torsion-preventing mechanism for the clamping member 28 can be discerned. To this effect, the accommodation sleeve 52 contains a lateral recess 53 in which a pin 55 is guided which engages into a bore 57 in clamping member 28.

In a preferred embodiment of this invention the accommodation sleeve and the press-in sleeve have contact surfaces 24 and 26 which, more particularly, are of conical design.

According to another expedient embodiment, a washer 64 is interposed between the accommodation sleeve and a step formed in the bore.

In a manner which is very feasible in terms of manufacture, the accommodation sleeve, the press-in sleeve and the threaded sleeve can be made from a straight tubular member.

Figure 4:
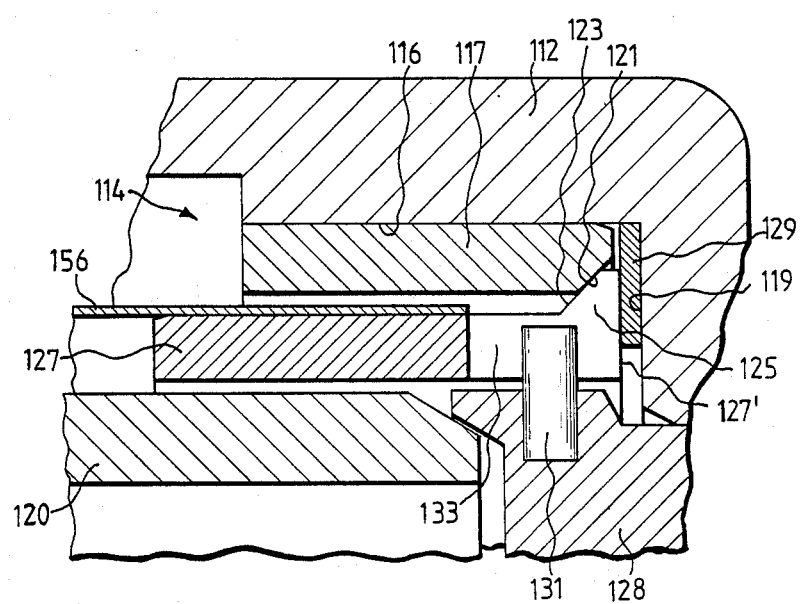

Another embodiment of the instant invention is illustrated in FIG. 4 and will be described in the following. As the inventive adjusting device corresponds largely with the embodiments according to FIGS. 1 to 3. Only those parts that are different are illustrated and will be described hereinbelow. For parts similar to those in FIGS. 1 to 3 reference will be made thereto. A stepped bore 114 is provided in the brake housing 112, with a bore portion 116 serving to secure a press-in sleeve 117 which can be made from a straight tubular member. A conical contact surface 121 is formed on the end of the sleeve facing the step 119 of the bore. This conical contact surface 121 coacts with another conical contact surface 123 which is formed on a radial extension 125 of the accommodation sleeve 127. At its outer periphery the accommodation sleeve carries the bowl-type spring retainer 156 only a portion of which is illustrated. A washer 129 is interposed between the end surface 127 and the step 119. Seated in the clamping member 128 is a pin 131 which engages into a recess 133 provided in the end area of accommodation sleeve 127. This creates a torsion-preventing mechanism for the clamping member 128 cooperating with the adjusting nut 120. For the assembly of the adjusting device, a cartridge-type adjusting unit composed of bowl-type spring retainer, accommodation sleeve and adjusting nut, can be supplied in a readily preassembled manner and inserted into the housing such that the slot of the accommodation sleeve is stuck onto the pin 131.

Subsequently, the press-in sleeve 117 is slid over the cartridge-type adjusting unit and pressed into the housing until it abuts on a stop. In this arrangement, the conical contact surfaces 121, 123 provide for centering and a secure axial and radial position.

What is claimed is:

1. An automatic adjusting device for a disc brake, comprising a brake piston which is displaceably arranged in a brake cylinder and which is acutatable by means of an actuating device; an extensible adjusting member arranged between the brake piston and the actuating device, said adjusting member comprising two adjusting elements interconnected by a thread; a friction clutch having conical friction surfaces for the purpose of selectively fixing one of the adjusting elements in position; one of the conical surfaces being on one of the adjusting elements and the other friction surface being on an actuatable clamping member; a bearing mechanism comprised of an inner bearing ring formed on one of the adjusting element which cooperates with an outer bearing ring to carry ball bearing means, one side of said bearing mechanism abutting a shoulder of an accommodation sleeve, the other side of said bearing mechanism bearing against one end of a spring in an associated bearing cage; a cupshaped spring retainer which supports the other end of said spring and which is secured to the brake housing by means of the accommodation sleeve, wherein the accommodation sleeve is a straight tubular member which can be pressed into a corresponding smooth circular bore in a brake housing, said bore having substantially the same diameter as said accommodation sleeve, whereby said accommodation sleeve is press fit into said corresponding bore.

2. The automatic adjusting device of claim 1, wherein the two adjusting elements are an adjusting spindle and an adjusting nut.

3. The automatic adjusting device for a disc brake of claim 2, wherein the adjusting nut projects into a recess in the clamping member.

4. The automatic adjusting device of claim 3, wherein the accommodation sleeve includes a lateral recess in which a pin is guided projecting into a bore of the clamping member.

5. The automatic adjusting device for a disc brake of claim 2, wherein the adjusting nut is a straight tubular member.

6. The automatic adjusting device of claim 1, wherein a compensating washer is interposed between the accommodation sleeve and a bottom shoulder of the bore.

7. The automatic adjusting device of claim 1, wherein the tube forming the accommodation sleeve has a smaller diameter portion and a portion having a larger diameter.

8. An automatic adjusting device for a disc brake, comprising a brake piston displaceably arranged in a brake cylinder and which is actuatable by means of an actuating device; an extensible adjusting member arranged between the brake piston and the actuating device, said adjusting member comprising two adjusting elements interconnected by a thread; a friction clutch having conical friction surfaces for the purpose of fixing one of the adjusting elements in position upon actuation; one of the conical surfaces being one of the adjusting elements and the other friction surface being on an actuatable clamping member; a bearing mechanism comprised of an inner bearing ring formed on one of the adjusting elements which cooperates with an outer bearing ring to carry ball bearing means, one side of said bearing mechanism abutting a shoulder of an accommodation sleeve, the other side bearing against one end of a spring in an associated bearing cage; a bowl-type spring retainer supporting the other end of said spring and which is secured to the brake housing by means of the accommodation sleeve, wherein the accommodation sleeve is pressed into a bore in a brake housing and is retained by a press-in sleeve secured in the bore, the bore having substantially the same diameter as said accommodation sleeve.

9. The automatic adjusting device of claim 8, wherein the two adjusting elements are an adjusting spindle and an adjusting nut.

10. The automatic adjusting device for a disc brake of claim 8, wherein the accommodation sleeve and the press-in sleeve have conical surfaces in engagement with each other.

11. The automatic adjusting device for a disc brake of claim 8, wherein a washer is placed between the accommodation sleeve and a step formed in the bore.

12. The automatic adjusting device for a disc brake of claim 8, wherein the accommodation sleeve and the press-in sleeve are straight tubular members.

13. The automatic adjusting device for a disc brake of claim 8, wherein the adjusting nut is made from a straight tubular member.

* * * * *